(12) United States Patent
Kim et al.

(10) Patent No.: US 8,555,487 B2
(45) Date of Patent: Oct. 15, 2013

(54) IMAGING DEVICE PRODUCTION SYSTEM

(75) Inventors: Myeong-Woo Kim, Gumi (KR); Jin-Sang Ah, Gumi (KR); Jae-Hyun Kim, Gumi (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 13/254,701

(22) PCT Filed: Jun. 12, 2009

(86) PCT No.: PCT/KR2009/003156
§ 371 (c)(1),
(2), (4) Date: Sep. 2, 2011

(87) PCT Pub. No.: WO2010/101333
PCT Pub. Date: Sep. 10, 2010

(65) Prior Publication Data
US 2011/0308070 A1 Dec. 22, 2011

(30) Foreign Application Priority Data
Mar. 3, 2009 (KR) .................. 10-2009-0017819

(51) Int. Cl.
*B23P 21/00* (2006.01)
*B23Q 15/00* (2006.01)

(52) U.S. Cl.
USPC ............ 29/711; 29/469; 29/593; 29/729; 29/742; 29/759; 700/244; 702/84

(58) Field of Classification Search
USPC .............. 29/469, 593, 711, 729, 742, 759; 700/244; 702/84
See application file for complete search history.

(56) References Cited

U.S. PATENT DOCUMENTS

| 4,602,429 | A | * | 7/1986 | Nicoll ........................ 29/884 |
| 4,711,009 | A | * | 12/1987 | Cornelison et al. ........... 29/890 |
| 4,792,033 | A | * | 12/1988 | Iwata et al. .................. 198/357 |
| 5,655,647 | A | * | 8/1997 | Wheeler .................... 198/861.5 |
| 5,709,303 | A | * | 1/1998 | Best ......................... 206/459.1 |
| 7,875,217 | B2 | * | 1/2011 | Yin et al. ..................... 264/1.36 |
| 2007/0094859 | A1 | | 5/2007 | Lee et al. |
| 2010/0170202 | A1 | * | 7/2010 | Bray et al. ..................... 53/444 |

FOREIGN PATENT DOCUMENTS

| KR | 2002-0027035 A | 4/2002 |
| KR | 10-2005-0015719 A | 2/2005 |
| KR | 10-2007-0046362 A | 5/2007 |

* cited by examiner

*Primary Examiner* — Paul D Kim
(74) *Attorney, Agent, or Firm* — Birch, Stewart, Kolasch & Birch, LLP

(57) ABSTRACT

Provided are an imaging device production system, an imaging device inspection system, and an imaging device inspection method. The imaging device production system includes a assembling process for assembling each components constituting an imaging device, an inspection process in which the imaging device assembled in he assembling process is continuously transferred without being stopped except for emergency when two inspection tasks adjacent to and different from each other are performed, and a packaging for packaging the imaging device which passes through the inspection tasks to confirm quality of the imaging device.

11 Claims, 15 Drawing Sheets

IMAGING DEVICE PRODUCTION SYSTEM

CROSS-REFERENCE TO RELATED APPLICATIONS

The present application claims priority under 35 U.S.C. 119 and 35 U.S.C. 365 to Korean Patent Application No. 10-2009-0017819 (filed on 3 Mar., 2009), which is hereby incorporated by reference in its entirety.

BACKGROUND

The present disclosure relates to an imaging device production system for the production of imaging devices, an imaging device inspection system for the inspection of imaging devices, and an imaging device inspection method.

As a device for displaying an image to be viewed by a user, an imaging device is typically subjected to an assembly process in which it is assembled and an inspection process in which it is inspected after assembly, in an imaging device production system.

The assembly process is configured with a palette for supporting at least one imaging device, and a rail on which the palette is conveyed. From the perspective of an operator, who handles the components that constitute an imaging device, after completing his/her allocated task with a palette put in a stationary state, the operator presses a button provided at his/her work station to move the palette to the next process. As a process for measuring the required performance or quality of an imaging device, the inspection process, like the assembly process, is a process in which a certain inspector performs his/her allocated task with an imaging device put in a stationary state, upon completion of which the imaging device is moved to the next inspection process.

In such an assembly process and inspection process, which are configured in a series of steps in which an imaging device is put in a stationary state, a task is performed, and the imaging device is then moved, sections of work stations may easily become backlogged, a high defect rate occurs, and yield over a unit of time decreases, due to inaccurate assessment of task difficulty, task complexity, and operator skill levels. Due to such limitations, the highest efficiency obtained through a related art production system of the present applicant is one imaging device every 18 seconds. Of course, various other limitations may arise from the inherent limitation of having to stop/perform task/move for every task stage.

Furthermore, in order to change a line inspection system that has been set for an inspection process, there is the inconvenience of having to change the positions of equipment, etc. Thus, when changing imaging device models, there is the inconvenience of having to install a separate production line or change a production line.

SUMMARY

Embodiments provide a production system for imaging devices, which is capable of improving the efficiency of imaging device production, reducing the rate of defects, and which may be singly applied to different imaging devices, regardless of their size.

Embodiments also provide an imaging device inspection system and inspection method capable of expediently, conveniently, and accurately inspecting an assembled imaging device. Embodiments further provide an imaging device inspection system and inspection method that enable an inspection process to be more quickly, conveniently, and accurately implemented, by means of increased the editing efficiency of each inspection task performed in an inspection process, through optimizing the processes for each type of imaging device.

In one embodiment, an imaging device production system includes: a assembling process for assembling each components constituting an imaging device; an inspection process in which the imaging device assembled in he assembling process is continuously transferred without being stopped except for emergency when two inspection tasks adjacent to and different from each other are performed; and a packaging for packaging the imaging device which passes through the inspection tasks to confirm quality of the imaging device.

The assembling process may be performed at the same rate, and a front panel, a module, a board, and a back cover constituting the imaging device are processed in order.

An elevation conveyor in which a rotation operation for raising the assembled imaging device and a transfer operation for transferring the imaging device in a transfer direction are performed may be disposed between the assembling process and the inspection process.

The inspection process may include a voltage resistance inspection process for inspecting an internal pressure of the assembled imaging device, and an aging process for increasing a temperature of the assembled imaging device may be performed at a rear side of a direct neighborhood of the voltage resistance inspection process.

A single inspection conveyor may be used from the aging process to the last of the inspection process.

A socket may be disposed on a top surface of the conveyor used in the inspection process.

The conveyor may be a slat conveyor including: a frame; a chain supported by the frame, the chain being transferred by an external force; an electroconductive block support by the chain; and an electricity supply mechanism for supplying an electricity into the electroconductive block, and the electricity supply mechanism may include: a rail to which a power source is connected, the rail extending in a transfer direction of the chain; and a brush electrically connected to the rail and the socket.

A main inspection process in which an inspection task for confirming quality of the assembled imaging device is performed in the inspection processes may include transferring the assembled imaging device at the same rate.

An operator may be disposed on a back side of the imaging device, and a mirror for reflecting an image of the imaging device toward the operator may be disposed in the main inspection process.

A white balance adjusting process for adjusting a white balance of the assembled imaging device in the inspection processes may be performed while the assembled imaging device is transferred.

A take-out process for taking the assembled imaging device may be performed between the inspection process and the packaging process, and the take-out process may be performed in a process in which a take-out conveyor and an auxiliary conveyor which is substantially equal to that of the take-out conveyor are replaced with each other.

A packaging material supplied into the packaging process may be supplied by dropping down along a chute.

In another embodiment, an imaging device inspection system includes: a sensor for detecting whether an imaging device entries in each inspection area; and a transmitting port which transmits a control signal into the imaging device in response to a detection signal of the sensor so that the imaging device is controlled according to the control signal.

Two transmitting ports may be provided on each inspection area.

An operator may be disposed on a back side of the imaging device, and a mirror for reflecting an image of the imaging device toward the operator may be provided.

In further another embodiment, an imaging device inspection system includes: a main controller disposed in each of partitioned inspection areas; and a computer parallelly connected to the main controller to transmit data into the main controller, wherein the main controller detects entrance of an imaging device to transmit a control signal to the image device.

A sensor connected to the main controller to detect the entrance of the imaging device and a transmitting port for transmitting the control signal into the imaging device in response to a detection signal of the sensor may be disposed in the inspection area, and the transmitting port may be provided in plurality and a model button for selecting the transmitting port may be disposed on the main controller.

The imaging device may be moved the partitioned inspection areas adjacent to each other without being stopped.

In still further another embodiment, an imaging device inspection method includes: detecting whether a moving imaging device entries into a specific inspection area; transmitting a control signal into the imaging device in which entrance thereof is detected; and inspecting the imaging device according to whether an operation corresponding to the control signal is performed in the imaging device.

During the performing of the inspection method, the imaging device may be continuously moved.

The details of one or more embodiments are set forth in the accompanying drawings and the description below. Other features will be apparent from the description and drawings, and from the claims.

BRIEF DESCRIPTION OF THE DRAWINGS

FIGS. 7 to 10 are views for illustrating a conveyor structure, wherein FIG. 7 is a top view, FIG. 8 is a sectional widthwise view of a conveyor, FIG. 9 is a top view of one electroconductive block configuring a conveyor, and FIG. 10 is a perspective view of a brush provided on an electroconductive block.

DETAILED DESCRIPTION OF THE EMBODIMENTS

Embodiments will be described in detail below with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
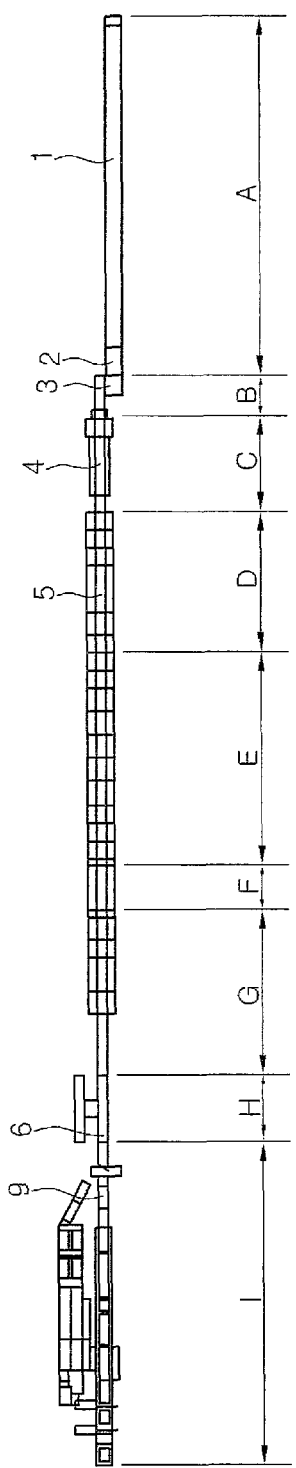
FIG. 1 is a schematic flowchart of an imaging device production system according to embodiments.

FIG. 1 is a schematic flowchart of an imaging device production system according to embodiments.

Referring to FIG. 1, an imaging device production system according to embodiments includes a conveyor system that autonomously moves at a certain speed. The conveyors for each process that configure the conveyor system may include: an assembly conveyor 1 used in an assembly process A in which an imaging device is assembled; a connecting conveyor 2 and raising conveyor 3 used in a raising process B in which the imaging device that is assembled in the assembly process A is raised for inspection; a voltage resistance inspection conveyor 4 used in an voltage resistance inspection process C in which high voltage is applied to test the voltage resistance of the imaging device; an inspection conveyor 5 for performing various inspections required for the supply of electric power to be used by the imaging device; a take-out conveyor 6 used in a take-out process H in which components, etc. deemed to have defects during the processes are taken out; and a packaging conveyor 9 used in a packaging process I.

Various inspections performed on the inspection conveyor 5 may include: an aging process D for aging the imaging device in preparation for a white balance process in which white balance is adjusted for the imaging device; a main inspection process E in which an assortment of inspections are performed on the imaging device; the white balance process F in which white balance is adjusted for the imaging device; and a final inspection process G for performing a final inspection on the imaging device to ensure there are no defects.

The above-described respective conveyors are linked to rotate as a single conveyor system in which individual conveyors, extending from the start to finish of any one process or two or more processes, operate in rotation. Moreover, when the processes of a production system are begun, the respective conveyors continuously rotate without stopping, except for when an andon switch, which is used in emergencies such as in the event of an accident, is actuated. According to another aspect, the hourly input quantity of components input at the front end of a production system is always the same as the produced quantity of imaging devices that emerge from the final production process, and similarly, the hourly throughput of imaging device that pass through any one process of the production system is always the same. Resultantly, the number of imaging devices that pass through any node of the imaging device production system according to embodiments per unit of time is the same, and continuous production is made possible.

From among the respective processes above, the voltage resistance inspection process C, the aging process D, the main inspection process E, the white balance adjusting process F, and the final inspection process G are inspection processes in which power is applied to the imaging device to inspect the imaging device. In terms of having to apply electric power, these processes are differentiated from the assembly process A, the take-out process H, and the packaging process I. In the overall process, the take-out process H and the packaging process I are separate from the actual assembly and inspection processes, and may be referred to as post control processes.

A description of the processes performed on each conveyor shall be provided below.

<Assembly Process>

Figure 2:
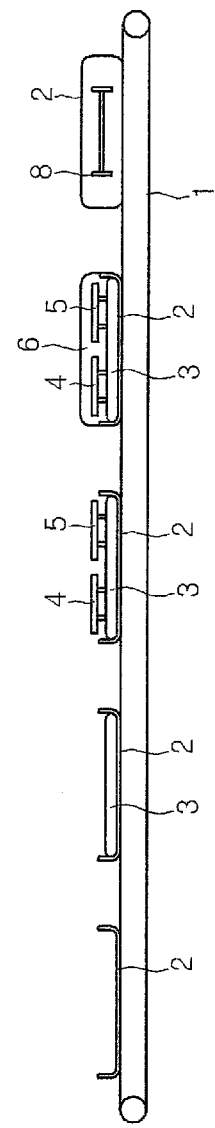
FIG. 2 is a view for illustrating the affect of an assembly conveyor along which an assembly process is performed.

FIG. 2 is a view for illustrating the affect of an assembly conveyor along which an assembly process A is performed.

Referring to FIG. 2, the assembly conveyor 1, as a single continuous conveyor system, has an elongated conveyor belt that rotates and passes from the start to the end of the assembly process. After a front panel 2 of an imaging device is first positioned on the assembly conveyor 1, the processes of fastening a module 3, power board 4, main board 5, and back cover 6 are performed to complete the assembly of the imaging device 7. Thereafter, a separate stand 8 for the assembly process is temporarily assembled. The stand 8 is fixed to the bottom portion of the imaging device 7.

Figure 3:
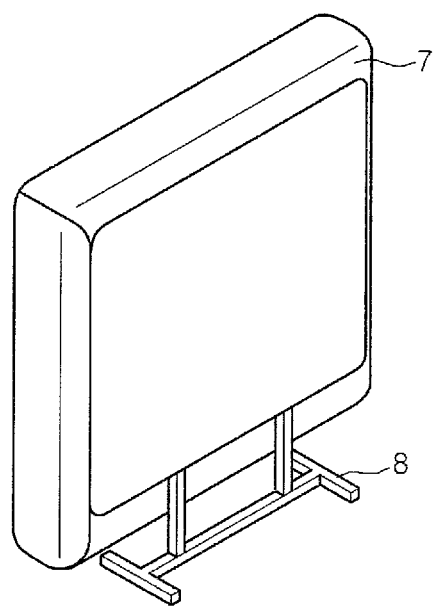
FIG. 3 is a view of an imaging device to which a stand is assembled.

FIG. 3 is a view of an imaging device to which a stand is assembled. It may be seen from FIG. 3 that the imaging device 7 may be maintained in an upright position when the stand 8 is inserted thereon.

As described above, because the assembly conveyor 1 according to embodiments continuously rotates at a uniform speed, what is required is to determine what amounts of work to allocate to operators in order to complete required tasks that are classified as single or multiple tasks. In this way, the assembly of imaging devices may be performed with the continuous conveying by the assembly conveyor 1. Thus, it may be understood that when faster assembly speed is required, more operators may be deployed, and required tasks may be further broken down and assigned. Of course, in the opposite case, a reverse approach may be applied. When compared to a related art production system employing palettes, in which assembly tasks are performed on the an imaging apparatus on top of a respective palette that has been stopped in front of an operator, after which a conveying button is pressed to convey the imaging device to the next stage, the embodiment described above may be expected to have improved productivity. Also, when one operator has conveyed a palette to the next operator, and the next operator has not yet completed an assembling task on the preceding imaging device, the inconvenience of having to allocate a standby space for the current palette being conveyed may be avoided, and thus, the length of the conveyor does not need to include that required for a standby space.

<Raising Process>

Figure 4:
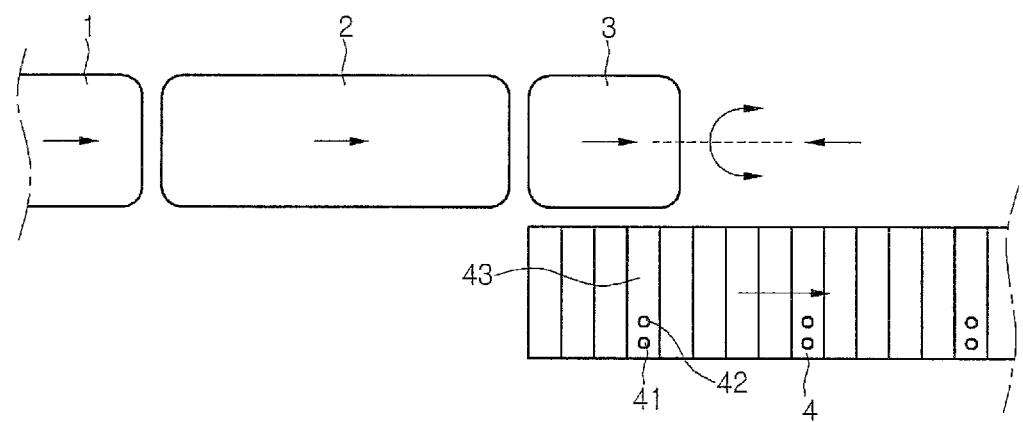
FIG. 4 is a view for illustrating the affect of a raising process.

FIG. 4 is a view for illustrating the affect of a raising process B in which a connecting conveyor and raising conveyor operate. In the raising process B, in order to inspect the quality of an assembled imaging device, the imaging device 7 that is lying sideways is raised. The raising process B is a required process for imaging devices, and is for orienting an image output unit that provides an image of the imaging device toward the front of the conveyor so as to be visible to an operator.

Figure 5:
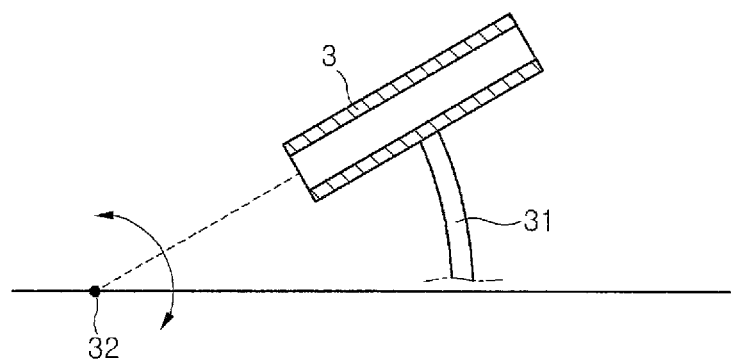
FIG. 5 is a view for illustrating the affect of a raising conveyor.

Referring to FIG. 4, the imaging device 7 is continuously conveyed at a certain speed by the conveyor 1 to be assembled. As illustrated in FIG. 5, in the raising conveyor 3, a lifter 31 rotates the imaging device about a predetermined central point 32. Here, the raising conveyor 3 pushes up the imaging device 7 supported by the raising conveyor 3, toward a voltage resistance inspection conveyor 4.

The connecting conveyor 2 connects and conveys the imaging device, which has been continuously conveyed at a certain speed by the assembly conveyor 1, to subsequent processes. In some cases, the speed of the connecting conveyor 2 may be varied in synchronization with the conveying speed of the assembly conveyor 1 and the subsequent voltage resistance inspection conveyor 4, so as to put the imaging device on standby.

Various actuating methods such as a pneumatic piston may be used to drive the lifter 31. Also, the stand 8 is installed oriented toward the voltage resistance inspection conveyor 4, so that when the imaging device 7 is erected, the stand 8 is supported on the top surface of the voltage resistance inspection conveyor 4.

While unintended movement or slippage during raising of the stand may be prevented to some degree by the conveyor belt friction of the raising conveyor 3, to better prevent such movement or slippage, a mounting jig (not shown) may be provided at an incline between the voltage resistance inspection conveyor 4 and the raising conveyor 3. The mounting jig may be provided at the lower end of the raising conveyor 3, so as to perform raising with the stand 8 in contact with the mounting jig, and may be folded after the raising process is completed. As another method, a jig conveyor (not shown) may be provided to be capable of rotating separately at a position aligned in front or at the rear of the raising conveyor 3 at the front end of the voltage resistance inspection conveyor 4. When the raising conveyor has been lowered, the jig conveyor may be raised so that the stand may be put into contact, and when the raising conveyor has been raised, the jig conveyor may be lowered to convey the imaging device 7 toward the voltage resistance inspection conveyor 4. Of course, various other methods may be used.

By following the above procedure, an image apparatus that was once lying flat during assembly may be raised to be conveyed to the subsequent inspection process.

<Voltage Resistance Inspection Process>

Processes for inspecting the quality of an imaging device primarily include processes in which a power supply is connected to the imaging device in order to determine whether its operating state is normal. To perform these processes, the plug of the imaging device must be connected to a power socket. Accordingly, a power supply must be connected to an imaging device from a voltage resistance inspection process C to a final inspection process G. Also, the voltage of power supplied to the socket through a power connecting mechanism may be different according to requirements. In order to perform an internal ground test of an imaging apparatus in the voltage resistance inspection process C, high voltage is required, and thus, high voltage must be applied to the rail 52. Also, for the general inspection processes D to G, a line voltage of 220V or 100V (which may be varied according to region) is connected to the rail 52. Thus, in order to supply a suitable level of power, a conveyor used for all of inspection processes C to G may be divided into a voltage resistance inspection conveyor 4 to which high voltage is applied, and an inspection conveyor 5 to which a general line voltage is applied. A conveyor system in embodiments, however, may use conveyors that are structurally the same without any modifications, to which only applied voltages are different, in the voltage resistance inspection process and the main inspection process.

The structure and affect of the voltage resistance inspection conveyor 4 and the inspection conveyor 5, and the structure and affect of a power supply connecting mechanism for connecting power to the conveyors, will be described in detail below.

By applying an internal high voltage to the imaging device in the voltage resistance inspection process C, electrical characteristics are tested, and the level of high voltage that the imaging device is able to withstand is tested. After the voltage resistance inspection process C is completed, the imaging device is moved to the inspection conveyor 5, which has a different applied voltage than the voltage resistance conveyor 4, in order to perform the aging process D.

<Aging Process>

Figure 6:
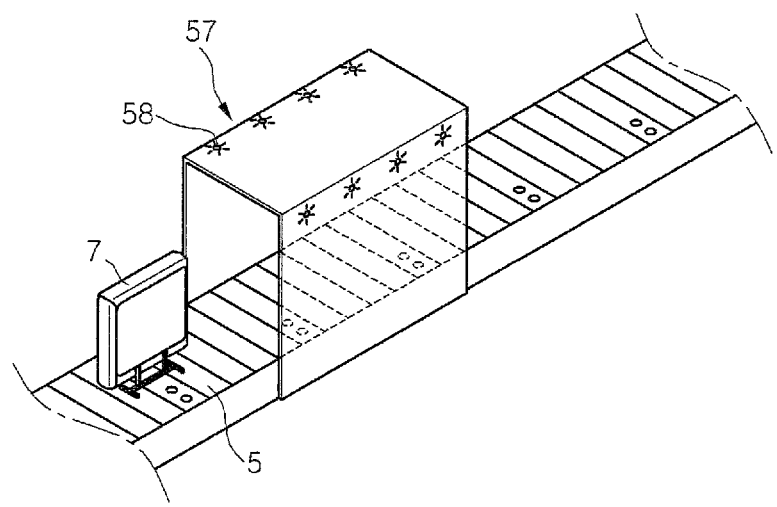
FIG. 6 is a schematic view illustrating an aging process.

FIG. 6 is a view for schematically illustrating an aging process. Referring to FIG. 6, beginning with the aging process D, a line voltage is applied to the conveyor, and the imaging device is conveyed in a state where the line voltage is applied to the imaging device, to the imaging device through a socket.

In order to induce a normal operating state of the imaging device, the aging process D is a process in which the imaging device is artificially operated under a certain temperature. According to embodiments, the imaging device passes through an aging room 57 containing a heat source 58 therein. The aging process D is particularly for adjusting the white balance of the imaging device under normal operating conditions in the white balance adjusting process F. Compared to a process in which an imaging device is simply maintained with power turned on for a long time without the aging process D according to embodiments, implementing the aging process D may result in quickly and forcibly raising the temperature of the imaging device 7, so as to reduce the process duration of the imaging device production system and the overall processing time.

<Structure and Affect of Voltage Resistance Inspection Conveyor and Inspection Conveyor>

After completing the aging process D, the main inspection process E is performed.

In the main inspection process E, the imaging device is controlled with a power supply connected to the imaging device, an inspection is performed on whether the imaging device operates in accordance with the input controls, and it is determined whether the quality of the imaging device is defective.

In order for power to be supplied to the imaging device 7 while it is being moved without stopping the inspection conveyor 5, a power socket is provided on the inspection conveyor 5. A power connecting mechanism is provided to supply power to the socket. A detailed description will be provided below of the structure and affect of the inspection conveyor 5 and the power connecting mechanism that supplies power to the inspection conveyor 5.

The structure and affect of the inspection conveyor 5 described below are the same as those of the voltage resistance inspection conveyor 4 except for a difference in the applied voltages.

Figure 7:
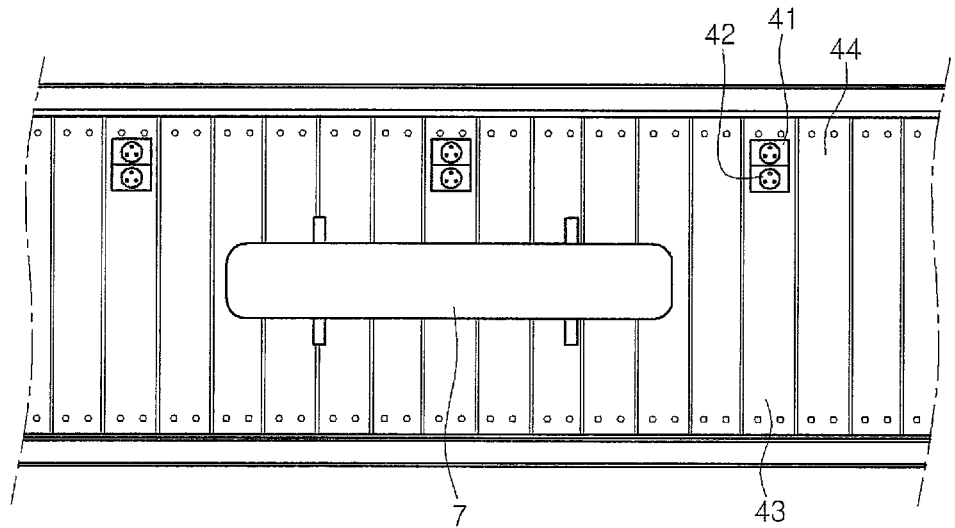
Figure 8:
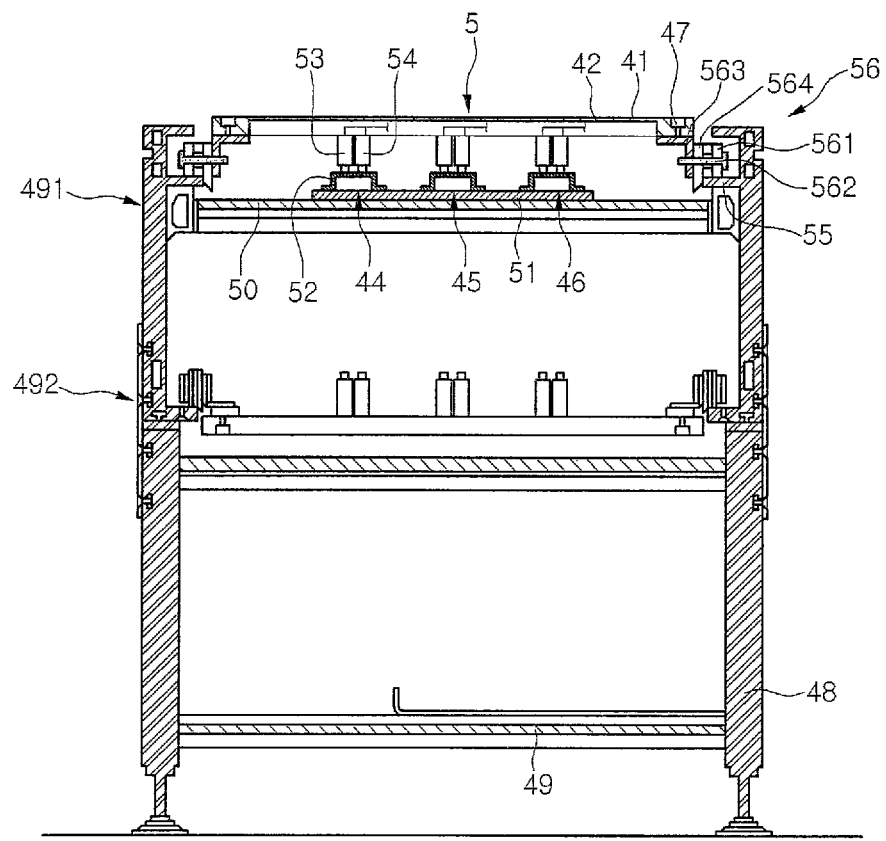
Figure 9:
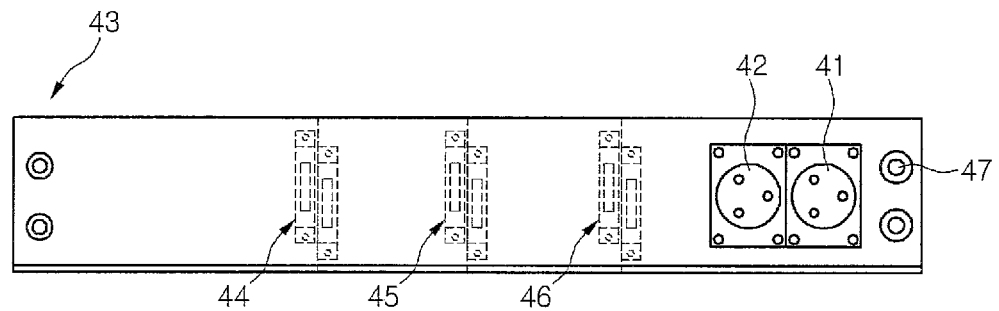
Figure 10:
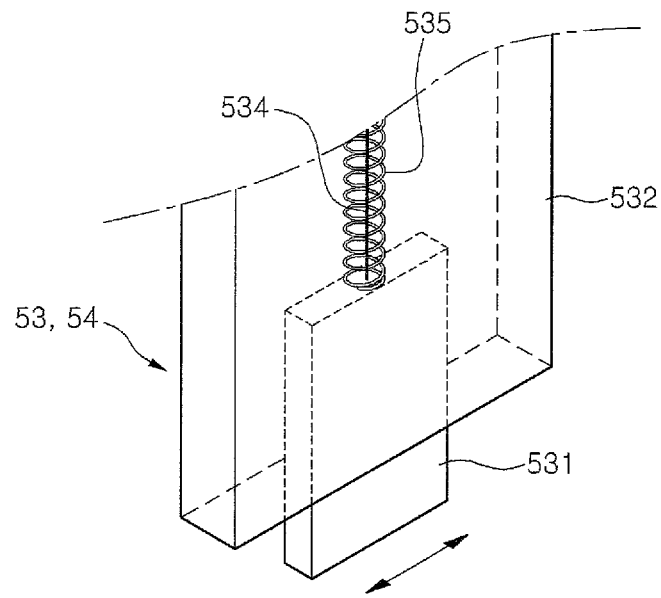

FIGS. 7 to 10 are views for illustrating the structure and affect of a conveyor in terms of how power is supplied, wherein FIG. 7 is a top view of a conveyor, FIG. 8 is a sectional widthwise view of a conveyor, FIG. 9 is a top view of one electroconductive block configuring a conveyor, and FIG. 10 is a perspective view of a brush provided on an electroconductive block. In the description below, items that are symmetrically provided in plurality may be described as single items, and it will be construed that such description applies to other symmetrical items.

The inspection conveyor 5 may be provided as a so-called slat conveyor, and the slat conveyor may be provided with an electroconductive block 43 including sockets 41 and 42, and a general block 44 that does not include sockets. Thus, an operator may insert the power plug of the imaging device 7 into the socket 41 or 42 at the initial stage of inspection. Thereafter, power is continuously supplied to the imaging device 7 by means of the connection between the power plug and socket, so that operators may perform only the tasks allotted to them.

A more detailed description of the structure of the inspection conveyor 5 will be provided.

A frame 48 is provided on the inspection conveyor 5, and a stand 49 is provided at the bottom of the frame 48, on which a main controller 101 and other equipment is placed. A conveying unit 491 and return unit 492, which perform the actual function of the conveyor, are provided on the top portion and intermediate portion of the frame 48. The conveying unit 491 is a portion that has an imaging device positioned thereon and performs a conveying function, and the return unit 492 is a portion that returns a conveyor belt, that has conveyed the imaging device to the end of the conveyor, back to the starting point. With the exception of lacking an electric connecting mechanism, the return unit 492 is the same as the conveying unit 491, and therefore only the conveying unit 491 shall be described below. Other than the electric connecting mechanism, the description shall apply to the return unit 492.

A sprocket (not shown) is provided at the end of the conveying unit 491 and/or the return unit 492, and a chain 56 that engages with the sprocket is provided. The conveyor is thus operated.

The chain 56 is a structure in which a bracket 563, position guider 564, and roller 561 are fixed by a predetermined shaft 562. The chain 56 (not shown) is continuously connected in the same configuration from the bottom of the floor to the top of the floor in FIG. 8, by means of a connecting structure such as the shaft 562.

The bracket 563 extends toward the electroconductive block 43 and the general block 44 to support the blocks 43 and 44, the roller 561 is capable of rotating in contact with a support rod 55 provided at a predetermined position on the frame 48 so as to support load on the chain 56 during conveying, and the position guide 564 contacts the support rod 55 and performs the function of accurately guiding the lateral position of the roller 561 in the drawings. The electroconductive block 43 and the general block 44 are fastened by a fastening part 47 provided at corresponding positions on the bracket 563.

According to this structure, when the chain 56 is moved by means of rotation of the sprocket 56, the electroconductive block 43 and the general block that are fixed to the chain 56 are also moved.

During movement of the electroconductive block 43, an electric connecting mechanism is provided to connect a power supply to the sockets 41 and 42. In particular, the electric connecting mechanism is provided with a rail 52 extending in the conveying direction of the conveyor, a rail support 50 for supporting the rail 52, an insulator 51 provided between the rail 51 and the rail support 50, and brushing parts 44, 45, and 46 provided to contact the rail. The brushing parts 44, 45, and 46 extend downward from the electroconductive block 43, and each of the brushing parts 44, 45, and 46 is provided with a pair of brushes 53 and 54. Each brushing part 44, 45, and 46 include a positive electrode, a negative electrode, and a ground electrode, and serially contact each socket 41 and 42. The two brushes on each brushing part are provided to contact each other so as to provide greater electrical contact reliability.

As illustrated in the perspective view of a brush provided on an electroconductive block in FIG. 10, each brush 53 and 54 includes a case 532, a connector 531 supported against the case 532, a spring 535 for resiliently supporting the connector 531 against the case 532, and an electric connector 534 for connecting power applied from the connector 531 to the outside of the brush. By means of the spring 535 resiliently pressing the connector 531 against the rail 52, reliability of contact between the rail 52 and the connector 531 may be improved, and therefore, electrical contact reliability may also be increased. The section of the connector 531 is formed in a rectangular shape that extends further in a direction parallel to the conveyed direction, so as to further improve contact reliability with the rail 52. Also, as shown by the top view of the electroconductive block in FIG. 9, a pair of brushes 53 and 54 provided on any one brushing part 44, 45, and 46 is provided askew at a certain distance from one another along the conveyed direction. Thus, the brushes 53 and 54 contact mutually different positions on the rail, thereby further improving electric contact reliability.

According to the above structure, power is applied to the rail 52, and the applied power is connected to the sockets 41 and 42 through the brushes 53 and 54 that contact the rail 52. Thus, the electric connecting function of the sockets 41 and 42 may be faithfully implemented.

It will be clearly understood from the above description that electric power is supplied to the sockets 41 and 42. It will thus be easily understood that an operator will be able to simply insert a plug of an imaging device into the socket at the top of the conveyor.

<Main Inspection Process>

Representative items for inspection performed on imaging devices at a production site include volume control, picture control, and mode switching, and in addition, there may be various other inspection categories. When these categories are combined into similar categories, and a single operator actuates a remote controller to perform tests, while a certain degree of testing efficiency may be attained by a skilled operator, this method ultimately relies on the operator, and cannot fundamentally ensure an improvement in production of imaging devices and a reduction in defects. According to present embodiments, the inspection categories are further divided (for example, volume control is divided into volume up and volume down sub categories) and allotted to a plurality of operators arranged in series so that each operator continuously performs a respective allocated task. In this manner, an improvement in work speed and accuracy in performing tasks of the operators may be realized.

Furthermore, the present inventor has discovered that when inspection categories are further divided, and imaging devices are not stopped in front of operators, inspection processes can be performed while the imaging devices are constantly moving. Moreover, the inventor has arrived at the present invention by searching for ways to perform inspection tasks on moving imaging devices, without overloading operators with tasks, in order to increase production through performing inspections on imaging devices moving at faster speeds.

Figure 11:
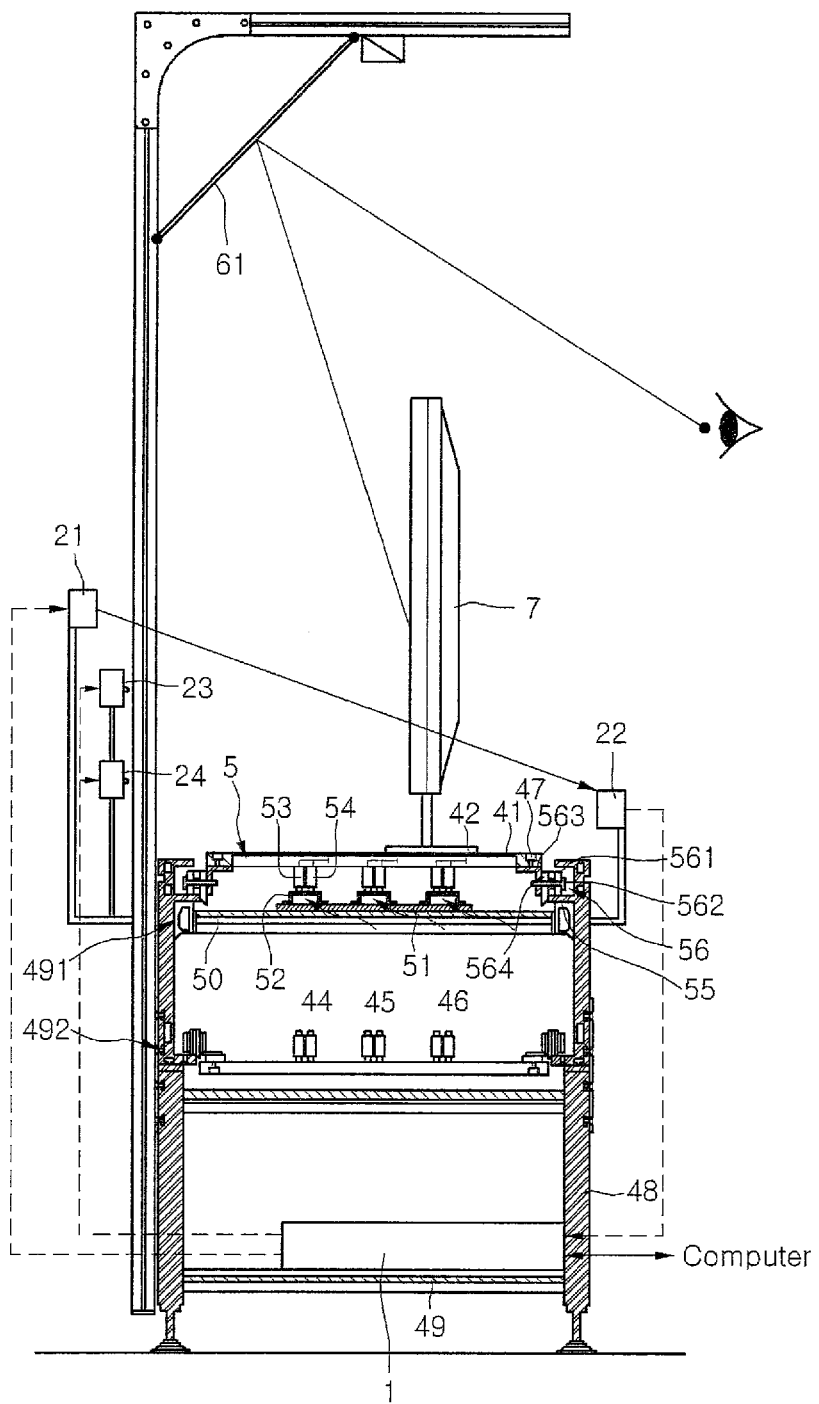
FIG. 11 is a schematic view illustrating an inspection task of an imaging device inspection system according to embodiments.

FIG. 11 is a schematic view illustrating an inspection task of a main inspection process of an imaging device inspection system according to embodiments.

Referring to FIG. 11, the imaging device 7 is continuously moved without being stopped in a state where it 7 is placed on the inspection conveyor 5. To perform an inspection task allocated to a specific inspection area on the continuously transferred imaging device 7, a sensor including a pair of transmitting unit 21 and receiving unit 22 to detect whether the imaging device 7 reaches an area in which a specific inspection task is performed is prepared. When it is detected that the imaging device 7 reaches the set specific area by a detection signal in which a signal transmitted from the transmitting unit 21 is detected by the receiving unit 22, the signal is transmitted using transmitting ports 23 and 24. Here, that the transmitting ports 23 and 24 are classified into a first transmitting port 23 and a second transmitting port 24 is because a remote controller receiving port of the imaging device 7 is changed in position according to a size of the imaging device 7. Also, if the signal is transmitted from an abnormal transmitting port, the signal may pass through a space part between the imaging devices and thus be received into an adjacent imaging device of the inspection system. The above-described operation may be controlled by a main controller (see reference numeral 101 of FIG. 13).

An operator observes whether the imaging device 7 is normally operated according to a remote controller control signal to perform the inspection task. Here, a task such as an increase or decrease of sound may be performed by hearing an output through a speaker of the imaging device 7. Since an image outputted through the imaging device 7 is reflected by a mirror 61, the operator may see the reflected screen to confirm whether the image is normally displayed. Thus, for the inspection task, only one operator is sufficient. This is done because the almost tasks for the inspection are automatically performed. In addition, since the number of tasks manually performed by the operator is reduced, a transfer rate of the inspection conveyor 5 may be quicker.

Figure 12:
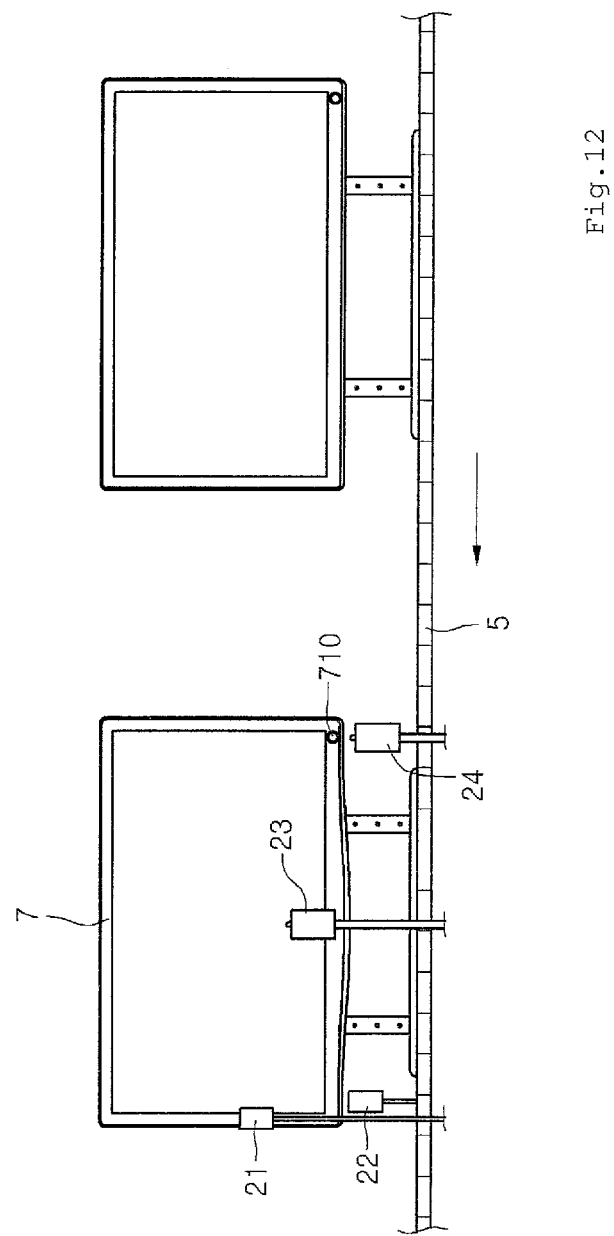
FIG. 12 is a schematic view illustrating an inspection task of an imaging device inspection system, based on an imaging device, according to embodiments

FIG. 12 is a schematic view illustrating an inspection task of an imaging device inspection system, based on an imaging device, according to embodiments.

Referring to FIG. 12, when the imaging device 7 entries into a specific task area, an output signal of the transmitting unit 21 may be covered by the imaging device 7, and thus the receiving unit 22 may not detect the signal outputted from the transmitting unit 21. Then, the receiving unit 22 may inform a non-detection state into a main controller 101. Of cause, an opposite operation may be possible. When the signal of the transmitting unit 21 covered by the imaging device 7 is detected by the receiving unit 22 through the space part between the imaging devices, a detection signal may be received into the main controller 101. However, in this case, positions on which the transmitting unit 21 and the receiving unit 22 are disposed and positions on which the transmitting ports 23 and 24 are disposed should be adequately aligned with each other. Also, in one case of the above-described cases, when the detection state is changed by the receiving unit 22, the transmitting ports 23 and 24 should be approximately aligned with the receiving port 71 of the imaging device 7. Thus, the signal transmitted from the prescribed transmitting ports 23 and 24 may be inputted into the receiving port 710.

When the detection signal is inputted from the receiving unit 22, the main controller 101 controls the selected transmitting port (the second transmitting portion 24 in FIG. 12) to transmit the remote controller control signal allocated to a corresponding task area.

The operator observes whether the imaging device 7 is operated according to the remote controller control signal allocated to the present task area through the mirror 61. When the imaging device 7 is normally operated, the operator does not something. When the imaging device 7 is abnormally operated, the operator may input the defective state into the main controller 101. As described above, since the operator performs the simplified task which observes whether the imaging device 7 is normally operated through the mirror 61, even if the inspection conveyor 5 is continuously transferred without being stopped, the operator may well perform the task. Furthermore, the transfer rate of the inspection conveyor 5 may be sufficiently quick.

Here, the transmitting ports 23 and 24 may be selectively used for each case according to a large-scale imaging device and a small-scale imaging device. The selection of the transmitting ports 23 and 24 may be set in the main controller 101 before the inspection task is performed or a separate detection unit may be provided to automatically select the transmitting ports 23 and 24. However, in consideration of the quick task and the continuously produced imaging device having the same specification, it is preferable that the transmitting ports 23 and 24 are selected before the inspection task is performed.

Only a preset predetermined inspection task is performed in a specific inspection task area which is under the control of one main controller. Here, the imaging device passes through the inspection task area. Then, the imaging device entries into the other inspection test area which is under the control of the other main controller and then the other inspection task is performed. For this, a plurality of main controller may be provided on the inspection conveyor 5 and each main controller may be operated under the control of a computer.

Figure 13:
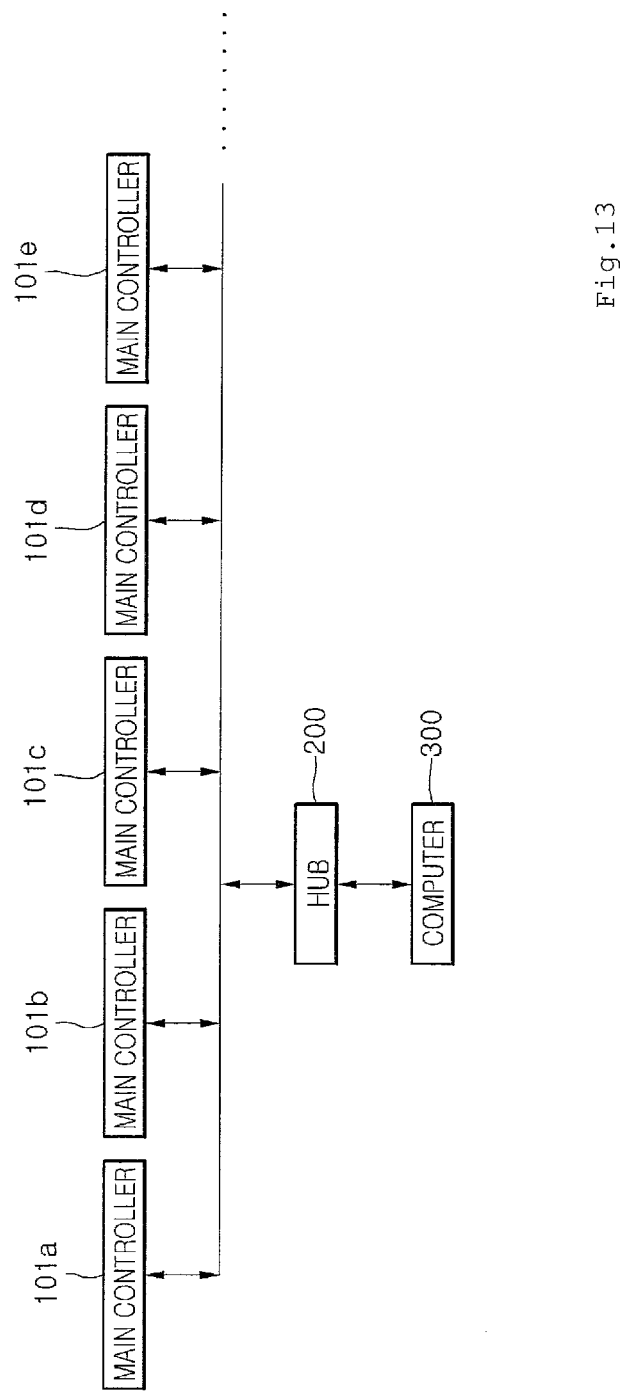
FIG. 13 is an overall block diagram of an imaging device inspection system according to embodiments.

FIG. 13 is an overall block diagram of an imaging device inspection system according to embodiments.

Referring to FIG. 13, in the imaging device inspection system according to an embodiment, a plurality of main controller 101*a*, 1*b*, 1*c*, 1*d*, and 1*e* connected to each other via a hub 200*b* under the control of a computer 300 are connected to each other in parallel. In the computer 300, remote controller data transmitted from the required transmitting ports 23 and 24 may be edited, stored, and transmitted into the main controller 101. In addition, the computer 300 may monitor tasks performed in each main controller 101. The main controller may store and perform an inspection task allocated to oneself.

In the imaging device inspection system in a production field according to an embodiment, as shown in FIG. 11, inspection tasks each being performed in one inspection area are disposed in one line and the imaging devices are continuously moved without being stopped. That is, the entry of the imaging device 7 may be detected under the control of the main controller 101 in each inspection area to output a preset remote controller control signal through the transmitting ports 23 and 23. As described above, since each of the plurality of main controllers 101 passes through an imaging device which is under the control of the corresponding main controller 101 to independently perform an allocated inspection task before the main controller 101 passes through the imaging device, the inspection task of the imaging device 7 may be continuously performed without being stopped. Thus, an inspection task performed by one main controller 101 may be newly defined and recognized to easily control a proceeding rate of the inspection task.

Figure 14:
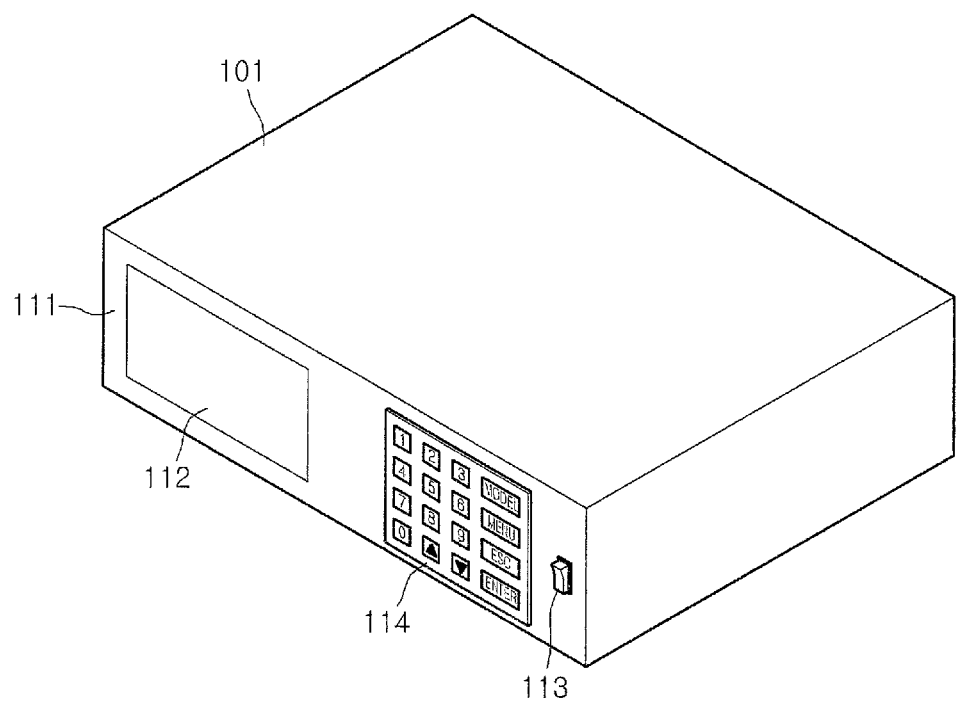
FIG. 14 is a perspective view of a main controller according to embodiments.

FIG. 14 is a perspective view of a main controller according to embodiments.

Referring to FIG. 14, a front surface of a main controller which is operated by an operator is mainly illustrated except for a connection part connecting the main controller to an external product. A display part 112 is disposed on a front surface of a case 111. Thus, a present task state performed by the main controller 101 may be observed or a manipulated state of the main controller 101 may be observed. A power button 113 may be provided to control an on/off of a power. A numeral button and a vertical moving button are disposed on the manipulation part 114, and also, the main controller 101 may be manipulated on the manipulation part 114. A model of an imaging device to be tasked in the present state may be inputted through a model button. Alternatively, a kind of transmitting ports 23 and 24 may be selected through the model button or an inspection task to be performed in the main controller 101 may be selected through the model button. For example, a specific task such as sound elevation or standard screen output may be selected in the inspection task. The menu button may perform selection of alarm for informing whether the main controller 101 is normally operated and perform a self-test of the main controller before the task starts. An esc button or an enter button may perform cancel of the editing or a task for including the present editing state during the editing process through the display part 112.

As described above, information may be transmitted into each main controller 101 through the computer 300, and an inspection task may be performed in a specific inspection area which is under the control of a specific main controller 101 according to the transmitted information. Also, a predetermined editing process may be performed on each of the main controllers 101. This is done for a reason in which a simple task is selectively manipulated in each task area to easily perform the corresponding task. For example, the main controllers 101 may be provided and operated in the whole inspection area to deal with a case in which an overall inspection such as an assembly of a new imaging device is required. Also, although the main controllers 101 are provided on the whole inspection area, in case where a re-task is required for the imaging device, when only one task or two or more inspection task is(are) performed over the whole inspection conveyor 5, only a selected specific main controller may perform the inspection task even though the imaging device passes through the whole inspection area. Here, in the inspection task, only the corresponding inspection task may be edited by the operator.

Figure 15:
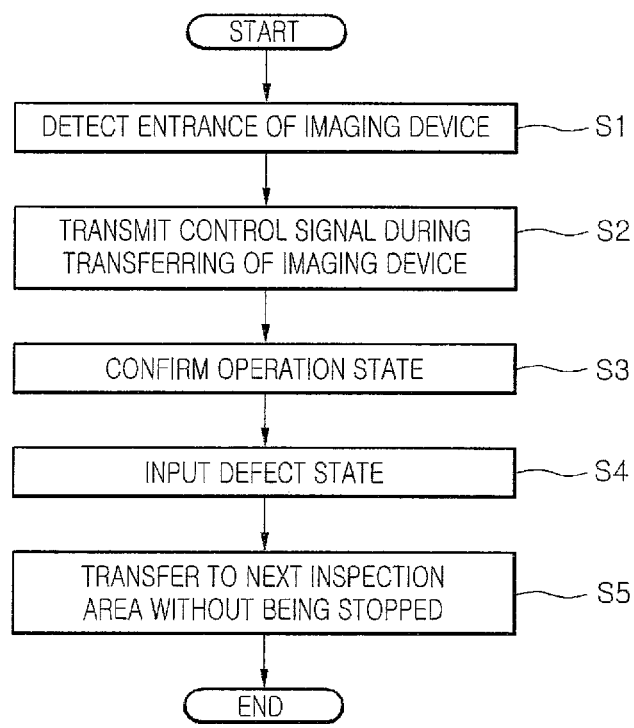
FIG. 15 is a flowchart of an imaging device inspection method according to embodiments.

FIG. 15 is a flowchart of an imaging device inspection method according to embodiments.

FIG. 15 illustrates an imaging device inspection method performed with respect to one task area. First, in operation S1, whether an imaging device entries into a corresponding task area is detected. When the imaging device entries, the imaging device transmits a control signal while being transferred in operation S2. The control signal may be set according to task areas, and thus, the operator may previously know the task areas.

An operation state of the imaging device may be changed corresponding to the control signal. Here, the imaging device may be manipulated according to the control signal if the imaging device is good. However, if the imaging device is poor, the imaging device may not be manipulated according to the control signal. Thus, in operation S3, the user may confirm when the imaging device is manipulated according to the recognized state. In operation S4, it is determined whether the imaging device is manipulated according to the control signal to input a fact in which the imaging device is poor when the imaging device is not manipulated according to the control signal. The imaging device inputted as a poor product may take out in the take-out process and be re-tasked.

In operation S5, the imaging device is transferred into the next inspection area without being stopped. Thereafter, whether the imaging device entries into the next inspection area in operation S1 may be detected to continuously perform the above-described inspection tasks.

In the above-described imaging device inspection method, a case in which the inspection task is performed one inspection area is described as an example. Thus, in the overall imaging device inspection method, when each inspection task is finished, the above-described processes may be repeatedly performed. Here, the imaging device may be continuously transferred without being stopped.

<White Balance Adjusting Process>

After a main inspection process E is performed, a white balance adjusting process F for imaging may be performed. The white balance adjusting process is a process in which that the same color is strongly recognized as a specific color such as a bluish white, a yellowish white, and reddish white is manipulated according to a user's preference. According to an embodiment, to match a white balance of a continuously transferred imaging device, a white balance adjusting device moving together with the imaging device is required. Before the imaging device reaches an area in which the white balance adjusting process F is performed, it may be seen whether the imaging device 7 is normal state already through an aging process D. Of cause, when the imaging device has a predetermined temperature or more by only an input power during the reaching of the imaging device into the white balance adjustment process F, the aging process D may not be separately required.

Figure 16:
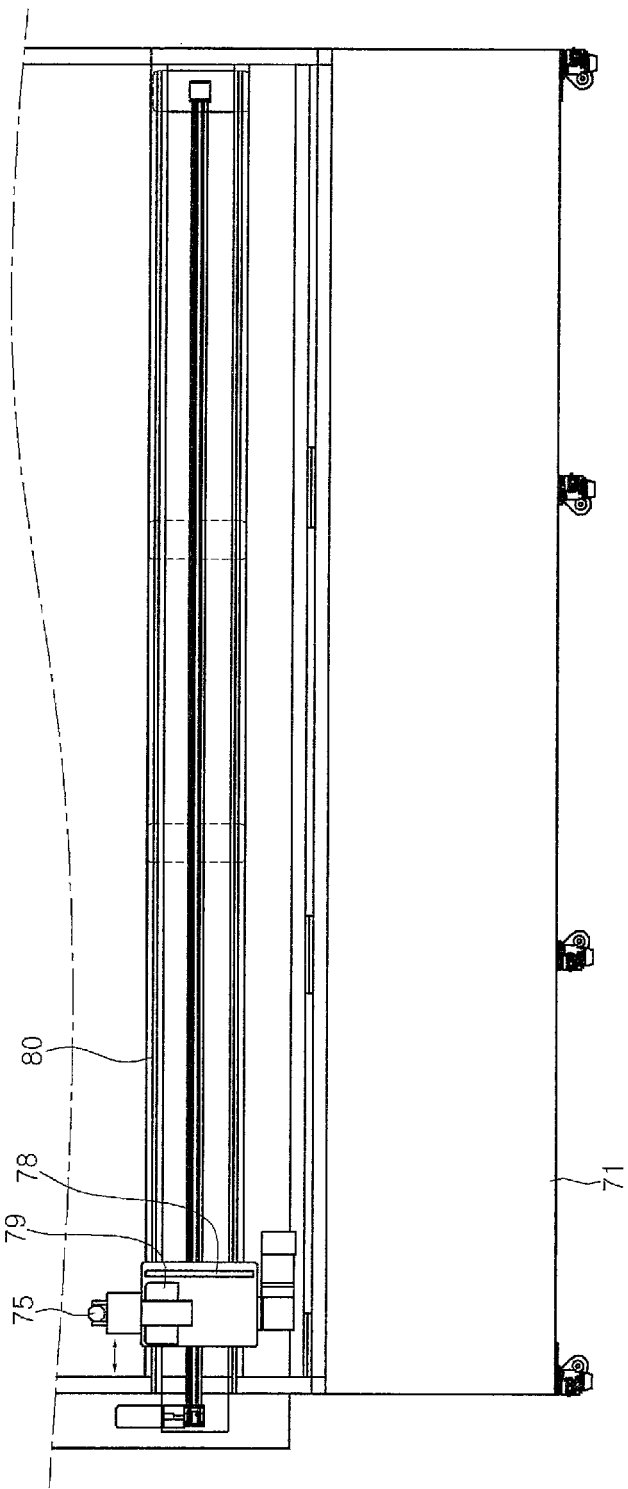
FIG. 16 is a front view of a white balance adjusting device.
Figure 17:
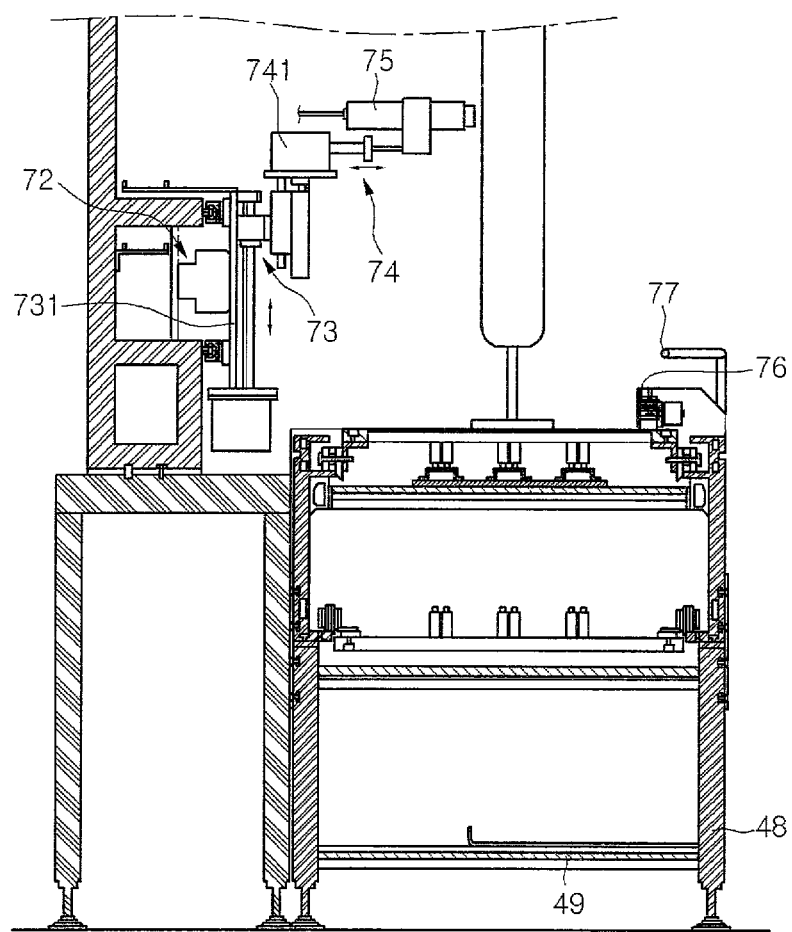
FIG. 17 is a side view of a white balance adjusting device.

FIG. 16 is a front view of a white balance adjusting device, and FIG. 17 is a side view of a white balance adjusting device.

Referring to FIGS. 16 and 17, a sensor mechanism 75 for detecting a white state of an image of the imaging device 7 and a remote controller output port 79 for transmitting a ROB adjusting signal into the imaging device are disposed on a side of a main frame 71 providing an inspection conveyor 5. Also, a light emitting part 78 and a receiving part 77 for detecting whether the imaging device 7 transferred by the inspection conveyor 5 entries into the white balance adjusting device are provided. When light is transmitted from the light emitting part 78 to the receiving part 77, it may be determined whether a new imaging device entries.

The sensor mechanism 75, the remote controller output port 79, and the light emitting part 78 may be moved together with the imaging device 7 by a predetermined moving mechanism. For this, a front and rear moving mechanism 74, a first driving module 741, and a second driving module 731 are provided. Here, the front and rear moving mechanism 74 is disposed at a rear side of a direct neighborhood of the sensor mechanism 75. Also, a driving part of the front and rear moving mechanism 74 is disposed on the first driving module 741. The second driving module 731 is provided in a state where the first driving module 741 and a vertical moving mechanism 73 are disposed. A driving part of the vertical moving mechanism 75 is disposed on the second driving module. The second driving module 731 may be movably supported on a frame 71 by a left and right moving mechanism 72. To precisely guide the second driving module 731 in left and right directions, a pair of guide rails 80 may be provided as a guide structure at a position of the second driving module 731. The moving mechanisms 72, 73, and 74 may be provided to a bar having a spiral groove in an outer surface thereof and a housing having a protrusion inserted into the spiral groove. Thus, the bar may be rotated to move the housing. Alternatively, other transfer mechanisms may be provided.

Due to the above-described structure, the sensor mechanism 75 may be three-dimensionally moved in all directions such as front and rear, left and right, and up and down directions.

Hereinafter, an operation of the white balance adjusting device having the above-described structure will be described.

Whether the imaging device to be adjusted newly entries is detected by a detection device including the light emitting part 78 and the receiving part 77. Then, the sensor mechanism 75 may be moved at an approximately central portion of a screen of the image device 7 by the moving mechanisms 72, 73, and 74. Here, information related to the position of the central portion of the screen may be controlled by preset center position information according to a kind of imaging devices. Also, the sensor mechanism 75 is disposed on a position corresponding to the central portion of the screen of the imaging device 7, and then, the left and right moving mechanism 72 is moved according to a moving rate of the imaging device 7 detected by an encode 76. Thus, the sensor mechanism 75 may be already disposed on the position corresponding to the central portion of the screen of the imaging device 7 while the imaging device 7 is transferred.

During the transfer of the imaging device 7, the sensor mechanism 75 detects a white balance of the central portion of the screen. A detected signal is transmitted into the controller to transmit a control signal through the remote controller output port 79 so that a target white balance is realized. The control signal may be received into the imaging device 7 to adjust a white state of the imaging device 7. Then, the adjusted white state may be detected again by the sensor mechanism 75 and transmitted into the controller. As described above, when it is determined that the white balance of the imaging device 7 reaches the target white balance by the sensor mechanism 75 after a control operation is performed for a predetermined time through a feedback control, the moving mechanisms 72, 73, and 74 may be manipulated to allow the imaging device 7 to return to its original position.

Thereafter, when a new imaging device to be adjusted entries, a series of above-described processes may be repeatedly performed.

<Final Inspection Process>

A final inspection process G is performed after the white balance adjusting process F. In the final inspection process G, it is inspected whether a foreign substance is trapped within a device, and whether a final image is normally output.

<Take-Out Process>

Figure 18:
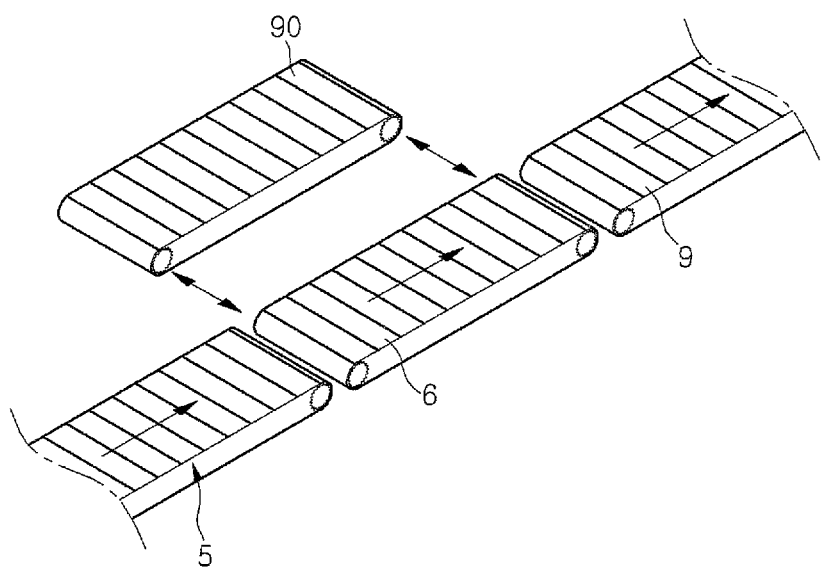
FIG. 18 is a schematic view illustrating a take-out process.

After the final inspection process G, a take-out process H is performed. In the take-out process H, a broken device is excluded, or a sample for quality inspection is selected. FIG. 18 is a schematic view illustrating a take-out process.

Referring to FIG. 18, the take-out conveyor 6 is disposed between the inspection conveyor 5 and the packaging conveyor 9, and an auxiliary take-out conveyor 90 is adjacent to the take-out conveyor 6. Accordingly, when a defective or experimental imaging device is placed on the take-out conveyor 6, the imaging device is transferred to a side of the take-out conveyor 6, and the auxiliary take-out conveyor 90 is disposed at the position of the take-out conveyor 6. Then, an operator takes out the imaging device from the take-out conveyor 6, and thus, a backlog of imaging devices transferred from the inspection conveyor 5 is fundamentally prevented. It is unnecessary to connect power to an imaging device from a process just before the take-out process H. In addition, a conveyor without an electric outlet may be used from the take-out process H.

<Packaging Process>

Figure 19:
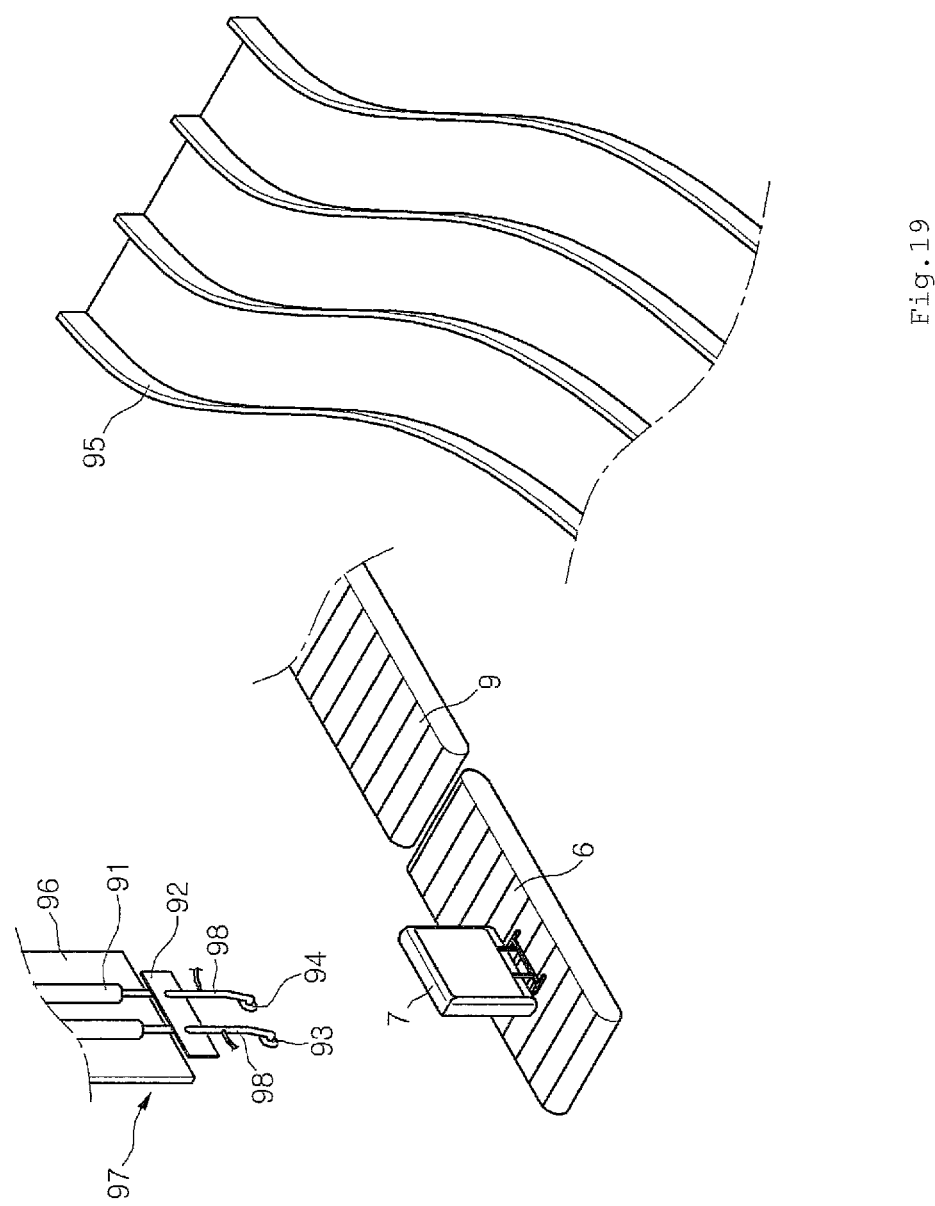
FIG. 19 is a schematic view illustrating a packaging process.

After a series of processes ranging from the assembly process to the inspection process, a packaging process I is performed. FIG. 19 is a schematic view illustrating a packaging process.

Referring to FIG. 19, an imaging device is packaged in the packaging process I.

The packaging conveyor 9 used in the packaging process I may perform a stopping operation. To this end, the packaging conveyor 9 may be transferred downward by gravity, and then, be stopped. Alternatively, the packaging conveyor 9 may includes a connecting conveyor, transfer speed of which can be adjusted, and a working conveyor disposed behind the connecting conveyor and performing a stopping operation. In this case, a transfer process at the connecting conveyor and the working conveyor is performed in a similar sequence to that of the standing process B.

To perform the packaging process I, an elevator 97 for vertically moving the imaging device 7 is disposed at a position on the packaging conveyor 9.

The elevator 97 includes a base 96 disposed at a ceiling thereof, a plurality of pneumatic pistons 91 disposed on the base 96, an elevating member 92 fixed to operating parts of the pneumatic pistons 91, a plurality of connections 98 extending downward from the elevating member 92, and a plurality of pneumatic adhering pads 93 and 94 disposed at a side of the connections 98.

Accordingly, when the imaging device 7 is stopped at a certain position on the packaging conveyor 9, the pneumatic pistons 91 are stretched out to move the elevating member 92 downward such that the pneumatic adhering pads 93 and 94 are aligned with the rear surface of the imaging device 7.

When the imaging device 7 is fixed to the connections 98 by an adhering operation of the pneumatic adhering pads 93 and 94, the pneumatic pistons 91 is retracted to raise the imaging device 7. In this state, the stand 8 is removed, and a lower packaging case is put under the imaging device 7. After that, the pneumatic pistons 91 are stretched out to put the imaging device 7 into the lower packaging case, then, the pneumatic adhering pads 93 and 94 are removed from the imaging device 7, and then, the pneumatic pistons 91 are retracted. Thereafter, the upper portion of the imaging device 7 is covered with an upper packaging case, and the imaging device 7 is packaged with a packaging case, thereby ending the packaging process I.

A chute 95 is disposed near a site where the packaging process I is performed. Parts such as packaging case or Styrofoam, which are disposed at a position higher than the production area, for example, on a second floor of the factory, drop down to the site where the packaging process I is performed, by the chute 95.

According to the production system of the present disclosure, when imaging devices are produced, the defect rate may be lowered, work distribution may be optimized, and the time required for each process for each type of imaging device may be accurately determined to enable process redistribution and continuous processing. Thus, the productivity for each type of imaging device may be optimized, operators are provided with more convenience, and continuous flow of processing is made possible.

According to the inspection system and inspection method of the present disclosure, assembled imaging devices may be expediently, conveniently, and accurately inspected. Also, the flow of inspection may be conveniently altered and managed.

In addition, various other effects may be derived from the description of embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

According to the embodiments, since time required for producing imaging devices can be significantly saved, and thus, the imaging device production system can be efficiently applied to an imaging device production field. In addition, a process for an imaging device is divided and continuous, thereby providing convenience to the operator, and reducing defects of products. Since various types of models can be produced in a single line, compatibility of the production system can be improved, and customized products can be produced. Since the degree of division of a process can be conveniently controlled, the process can be efficiently rearranged/reconstructed if necessary.

According to the embodiments, an imaging device can be quickly, conveniently, and accurately inspected, the imaging device inspection system and method can be efficiently applied to an imaging device production field. In addition, since an inspection process can be conveniently modified, the inspection process can be continuously performed regardless of an operator's ability, and completely correspond to the type of an imaging device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An imaging device production system comprising:
an assembly conveyor for an assembling process for assembling each component constituting an imaging device;
a conveyor for an inspection process in which the imaging device assembled in the assembling process is continuously transferred without being stopped except for emergency when two inspection tasks adjacent to and different from each other are performed; and
a packaging conveyor for a packaging process for packaging the imaging device which passes through the inspection tasks to confirm quality of the imaging device,
wherein the conveyor for the inspection process includes:
a voltage resistance inspection conveyor for a voltage resistance inspection process for inspecting an internal pressure of the assembled imaging device; and
an inspection conveyor for an aging process for increasing a temperature of the assembled imaging device.

2. The imaging device production system according to claim 1, wherein the assembling process is performed at the same rate, and a front panel, a module, a board, and a back cover constituting the imaging device are processed in order.

3. The imaging device production system according to claim 1, wherein an elevation conveyor in which a rotation operation for raising the assembled imaging device and a transfer operation for transferring the imaging device in a transfer direction are performed is disposed between the assembly conveyor and the inspection conveyor.

4. The imaging device production system according to claim 1, wherein a single inspection conveyor is used from the aging process to the last of the inspection process.

5. The imaging device production system according to claim 1, wherein a socket is disposed on a top surface of the conveyor for the inspection process.

6. The imaging device production system according to claim 5, wherein the conveyor for the inspection process is a slat conveyor comprising:
- a frame;
- a chain supported by the frame, the chain being transferred by an external force;
- an electroconductive block support by the chain; and
- an electricity supply mechanism for supplying an electricity into the electroconductive block, and
- the electricity supply mechanism comprises:
  - a rail to which a power source is connected, the rail extending in a transfer direction of the chain; and
  - a brush electrically connected to the rail and the socket.

7. The imaging device production system according to claim 1, wherein a main inspection process in which an inspection task for confirming quality of the assembled imaging device is performed in the inspection process comprises transferring the assembled imaging device at the same rate.

8. The imaging device production system according to claim 7, wherein an operator is disposed on a back side of the imaging device, and a mirror for reflecting an image of the imaging device toward the operator is disposed in the main inspection process.

9. The imaging device production system according to claim 1, further comprising a white balance adjusting process for adjusting a white balance of the assembled imaging device in the inspection processes which is performed while the assembled imaging device is transferred.

10. The imaging device production system according to claim 1, further comprising a take-out process for taking the assembled imaging device which is performed between the inspection process and the packaging process,
   wherein the take-out process is performed in a process in which a take-out conveyor and an auxiliary conveyor which is substantially the same as the take-out conveyor are replaced with each other.

11. The imaging device production system according to claim 1, wherein a packaging material supplied into the packaging process is supplied by dropping down along a chute.

* * * * *